(12) United States Patent
Nilsson et al.

(10) Patent No.: US 10,542,512 B2
(45) Date of Patent: Jan. 21, 2020

(54) TIME SYNCHRONIZATION OF STATIONS

(71) Applicant: Telefonaktiebolaget LM Ericsson (publ), Stockholm (SE)

(72) Inventors: Thomas Nilsson, Malmö (SE); Dzevdan Kapetanovic, Lund (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 40 days.

(21) Appl. No.: 15/535,146

(22) PCT Filed: Dec. 17, 2014

(86) PCT No.: PCT/EP2014/078153
§ 371 (c)(1),
(2) Date: Jun. 12, 2017

(87) PCT Pub. No.: WO2016/095979
PCT Pub. Date: Jun. 23, 2016

(65) Prior Publication Data
US 2017/0353938 A1    Dec. 7, 2017

(51) Int. Cl.
*H04W 56/00* (2009.01)
(52) U.S. Cl.
CPC ..... *H04W 56/0045* (2013.01); *H04W 56/001* (2013.01)
(58) Field of Classification Search
CPC ......... H04W 56/0045; H04W 56/0005; H04W 56/001; H04W 84/12; H04W 64/00;
(Continued)

(56) References Cited

U.S. PATENT DOCUMENTS

2004/0141570 A1*  7/2004  Yamazaki ........... H04L 25/0204
                                                         375/340
2005/0084030 A1*  4/2005  Zhou .................... H04L 1/0618
                                                         375/267
(Continued)

FOREIGN PATENT DOCUMENTS

CN         101426284 A    5/2009
EP           1717970 A2   11/2006
(Continued)

OTHER PUBLICATIONS

Morelli, Michele et al., "Synchronization Techniques for Orthogonal Frequency Division Multiple Access (OFDMA): A Tutorial Review," Proceedings of the IEEE, vol. 95, Issue 7, Jul. 2007, IEEE, pp. 1394-1427.
(Continued)

*Primary Examiner* — Kyaw Z Soe
(74) *Attorney, Agent, or Firm* — Withrow & Terranova, PLLC

(57) ABSTRACT

There is provided a method for time synchronization of stations (STAs) in a wireless local area network. An access point (AP) transmits a request to at least two STAs for the at least two STAs to transmit a response to the AP, the request indicating which frequency sub-band each of the at least two STAs is to use for transmitting the response. Responses to the request are received from the at least two STAs, wherein each of the responses comprises orthogonal frequency-division multiple access (OFDMA) symbols. For each of the at least two STAs, a time delay is determined based on the responses. Then, control signalling is transmitted to the at least two STAs, the control signalling comprising time alignment commands for the at least two STAs, wherein each time alignment command is based on the time delay for one of the at least two STAs.

36 Claims, 4 Drawing Sheets

(58) Field of Classification Search
CPC ............. H04W 72/0453; H04L 5/0007; H04L 1/1685; H04L 1/1854; H04L 2001/0093; H04L 27/2666; H04B 7/0452
See application file for complete search history.

(56) References Cited

U.S. PATENT DOCUMENTS

| | | | |
|---|---|---|---|
| 2006/0050742 A1* | 3/2006 | Grandhi | H04B 7/0413 370/506 |
| 2008/0198942 A1* | 8/2008 | Akella | H04L 25/0232 375/260 |
| 2009/0245222 A1* | 10/2009 | Sampath | H04L 27/2607 370/343 |
| 2010/0014600 A1* | 1/2010 | Li | H04L 25/0212 375/260 |
| 2010/0054233 A1* | 3/2010 | Park | H04L 27/2602 370/350 |
| 2010/0097962 A1* | 4/2010 | Sahara | H04L 5/0091 370/280 |
| 2010/0284312 A1 | 11/2010 | Sampath et al. | |
| 2012/0294245 A1 | 11/2012 | Chang et al. | |
| 2013/0028204 A1* | 1/2013 | Dinan | H04W 72/042 370/329 |
| 2013/0242875 A1* | 9/2013 | Abraham | H04W 56/00 370/328 |
| 2013/0286959 A1 | 10/2013 | Lou et al. | |
| 2014/0307653 A1 | 10/2014 | Liu et al. | |
| 2015/0063258 A1* | 3/2015 | Merlin | H04L 47/12 370/329 |
| 2015/0215149 A1* | 7/2015 | Mochizuki | H04L 27/2695 375/219 |
| 2015/0282211 A1* | 10/2015 | Zhang | H04W 74/06 370/329 |
| 2016/0374085 A1* | 12/2016 | Chun | H04W 52/146 |
| 2017/0111096 A1* | 4/2017 | Nabetani | H04B 7/04 |

FOREIGN PATENT DOCUMENTS

| | | |
|---|---|---|
| EP | 2073415 A1 | 6/2009 |
| EP | 2690919 A1 | 1/2014 |

OTHER PUBLICATIONS

Van Nee, Richard, "Uplink MU-MIMO Sensitivity to Power Differences and Synchronization Errors," Presentation on them: IEEE 802.11-09/1036-00-00ac, Sep. 2009, Qualcomm, 17 slides=.

International Search Report and Written Opinion for International Patent Application No. PCT/EP2014/078153, dated Aug. 11, 2015, 10 pages.

Search Report for Chinese Patent Application No. 201480084194.6, dated Oct. 11, 2019, 2 pages.

First Office Action for Chinese Patent Application No. 201480084194.6, dated Oct. 21, 2019, 17 pages.

* cited by examiner

TIME SYNCHRONIZATION OF STATIONS

This application is a 35 U.S.C. § 371 national phase filing of International Application No. PCT/EP2014/078153, filed Dec. 17, 2014, the disclosure of which is incorporated herein by reference in its entirety.

TECHNICAL FIELD

Embodiments presented herein relate to time synchronization of stations, and particularly to methods, an access point, a station, computer programs, and a computer program product for synchronization of stations in a wireless local area network.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is synchronization in time between network nodes, such as access points (APs) and wireless terminals, such as Stations (STAs) served by the network nodes.

Timing Advance is in cellular communications networks, such as Long Term Evolution (LTE) networks, used as a negative offset between the received subframe at the network node and the start of the subframe to be transmitted in the uplink (UL) from the wireless terminal. Timing Advance is used to ensure that the uplink subframes are synchronized at the network node and hence provide synchronization in time between the network nodes and the wireless terminals. The network node needs to estimate the misalignment in the uplink from each served wireless terminal to its own time reference for the subframes. In LTE the timing advance is estimated by the network node based on signalling from the wireless terminals on the Physical Random Access Channel (PRACH) in the uplink during initial access of the wireless terminal. The network node may use any reference signals in the uplink from the wireless terminals to estimate the timing advance. The network node then transmits the timing advance commands in a Random Access Response (RAR). This Timing Advance mechanism enables the wireless terminals to synchronize to the internal clock of the network node.

Unlike cellular communications networks, such as LTE, there is no common reference clock in non-cellular communications networks, such as wireless local area networks as standardized, for example, in IEEE 802.11 to use for synchronization in time. Because only one STA is transmitting at a time, the timing for transmission in the UL is just based on the timing for the reception in the downlink (DL). Effectively this means that from the AP's point of view, the delay between the end of the DL transmission and the start of the UL reception may vary depending on the distance from the AP to the STA. Specifically, the larger the distance between the AP and the STA, the larger the delay between transmission and reception will be. Thus, the above disclosed Timing Advance mechanisms are not currently needed, nor available, in IEEE 802.11. However, for the upcoming standard IEEE 802.11ax, orthogonal frequency-division multiple access (OFDMA) is considered as one component in the UL.

The operation of any IEEE 802.11 network is not dependent on strict synchronization between the AP and STAs. The STAs and APs are instead synchronized on a higher protocol level by the exchange of data/control frames. The smallest unit of time on the channel is one time slot (having a length of 9 μs in IEEE 802.11ac). The AP and the STAs are contending for accessing the channel by using Carrier Sense Multiple Access with Collision Avoidance (CSMA/CA). The level of timing accuracy in the contention is in the order of the propagation delay between the contending AP/STAs.

The introduction of uplink OFDMA or uplink multi-user multiple-input multiple-output (MU-MIMO) mechanisms in IEEE 802.11ax may generally require that the signals from the STAs arrive at the AP within the cyclic prefix (CP), as comprised in the OFDM symbols transmitted from the STAs to the AP. If this requirement is not fulfilled, then Inter Symbol Interference (ISI) will degrade the performance. There are currently no mechanisms available in IEEE 802.11 to synchronize the STAs with the AP on the physical (PHY) protocol layer to achieve the accuracy required by OFDMA in the uplink.

For the OFDM based IEEE 802.11 standards, the default length of the CP is 0.8 μs and will only suffice for shorter channels with small delay spread. At the AP, all the received signals from the STAs will therefore be in at least some scenarios not arrive within the CP (if the propagation delays over the communications channel between the AP and the STAs are very different). One approach, as disclosed in US2013286959 A1, is to use a long guard interval In this respect, guard interval, guard period, and cyclic prefix, generally refer to the same technical feature. US2013286959 A1 discloses a method and apparatus to be configured to support coordinated orthogonal block-based resource allocation (COBRA) operations. An AP may be configured to indicate to a plurality of STAs that it may support COBRA. As particularly noted in US2013286959 A1, when the combination of timing difference due to uplink COBRA STAs and delay due to multi-path channel are larger than a guard interval of an OFDM system, the receiver (i.e., the AP) may have difficulty detecting the packets. Utilizing long guard intervals for uplink COBRA transmissions may be part of the solution. Moreover, the AP may estimate the round trip delay for one ore more STAs, and broadcast this information in an uplink COBRA announcement frame. The STAs may adjust the transmission time accordingly such that packets from all the uplink COBRA STAs may arrive within the guard interval. However, using such long guard intervals will at the same time increase the overhead and lower the system throughput.

Hence, there is still a need for an improved time synchronization of STAs in a wireless local area network.

SUMMARY

An object of embodiments herein is to provide efficient time synchronization of STAs in a wireless local area network.

According to a first aspect there is presented a method for time synchronization of stations (STAs) in a wireless local area network. The method is performed by an access point (AP). The method comprises transmitting a request to at least two STAs for the at least two STAs to transmit a response to the AP, the request indicating which frequency sub-band each of the at least two STAs is to use for transmitting the response. The method comprises receiving the responses to the request from the at least two STAs, wherein each of the responses comprises orthogonal frequency-division multiple access (OFDMA) symbols. The method comprises determining, for each of the at least two STAs, a time delay based on the responses. The method comprises transmitting control signalling to the at least two STAs, the control signalling comprising time alignment commands for the at least two STAs, wherein each time alignment command is based on the time delay for one of the at least two STAs.

Advantageously this provides efficient time synchronization of the STAs in the wireless local area network.

Advantageously this time synchronization is provided as a common reference between the AP and the STAs that may vary in time (i.e., when steps of the method according to the first aspect are repeated).

Advantageously this enables inter symbol interference (ISI) to be reduced in further uplink transmission from the STAs to the AP.

Advantageously this enables the AP to have the flexibility to, depending on the estimated time delays of the STAs, schedule further uplink transmission from the STAs to the AP.

According to a second aspect there is presented an access point (AP) for time synchronization of stations (STAs) in a wireless local area network. The AP comprises a processing unit. The processing unit is configured to cause the AP to transmit a request to at least two STAs for the at least two STAs to transmit a response to the AP, the request indicating which frequency sub-band each of the at least two STAs is to use for transmitting the response. The processing unit is configured to cause the AP to receive the responses to the request from the at least two STAs, wherein each of the responses comprises orthogonal frequency-division multiple access (OFDMA) symbols. The processing unit is configured to cause the AP to determine, for each of the at least two STAs, a time delay based on the responses. The processing unit is configured to cause the AP to transmit control signalling to the at least two STAs, the control signalling comprising time alignment commands for the at least two STAs, wherein each time alignment command is based on the time delay for one of the at least two STAs.

According to a third aspect there is presented a computer program for time synchronization of stations in a wireless local area network, the computer program comprising computer program code which, when run on a processing unit of an access point, causes the access point to perform a method according to the first aspect.

According to a fourth aspect there is presented a method for time synchronization of a station (STA) in a wireless local area network. The method is performed by the STA. The method comprises receiving a request from an access point (AP) for the STA to transmit a response to the AP, the request indicating which frequency sub-band the STA is to use for transmitting the response. The method comprises transmitting the response to the AP in the indicated frequency sub-band, wherein the response comprises orthogonal frequency-division multiple access (OFDMA) symbols. The method comprises receiving control signalling from the AP, the control signalling comprising a time alignment command for the STA, wherein the time alignment command is based on a time delay for the STA determined based on the response.

According to a fifth aspect there is presented a station (STA) for time synchronization of the STA in a wireless local area network. The STA comprises a processing unit. The processing unit is configured to cause the STA to receive a request from an access point (AP) for the STA to transmit a response to the AP, the request indicating which frequency sub-band the STA is to use for transmitting the response. The processing unit is configured to cause the STA to transmit the response to the AP in the indicated frequency sub-band, wherein the response comprises orthogonal frequency-division multiple access (OFDMA) symbols. The processing unit is configured to cause the STA to receive control signalling from the AP, the control signalling comprising a time alignment command for the STA, wherein the time alignment command is based on a time delay for the STA determined based on the response.

According to a sixth aspect there is presented a computer program for time synchronization of a station in a wireless local area network, the computer program comprising computer program code which, when run on a processing unit of the station, causes the station to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 5, 6, 7, and 8 are flowcharts of methods according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
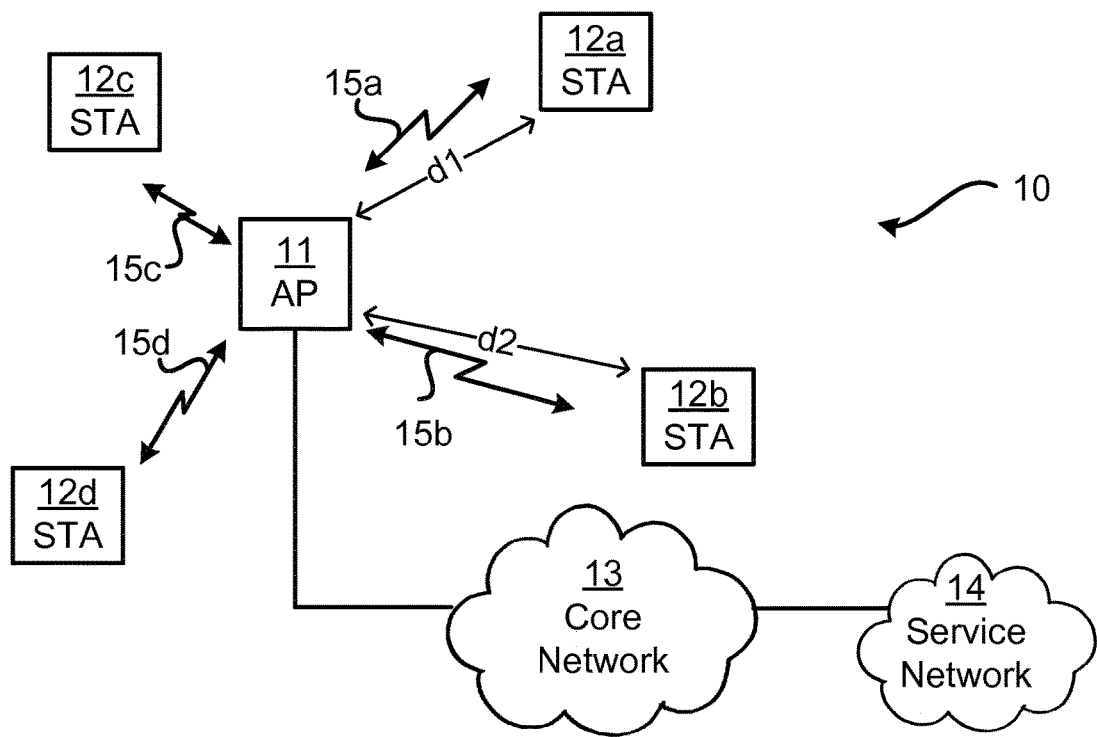
FIG. 1 is a schematic diagram illustrating a communication network according to embodiments.

FIG. 1 is a schematic diagram illustrating a communications network 10 where embodiments presented herein can be applied. The communications network comprises a network node in the form of an access points (AP) ii. The AP 11 is configured to provide network coverage to wireless devices, or stations (STAs), 12a, 12b, 12c, 12d. The STAs 12a-d may be any combination of hand-held wireless transceiver devices, such as mobile phones, smartphones, tablet computer, or laptop computers or the like, or other types of user equipment (UE). The AP 11 thus acts as radio base stations for the STAs 12a-d. Each STA 12a-d is configured to be operatively connected to at least one AP 11 via a wireless link 15a, 15b, 15c, 15d. The communications network 10 further comprises a core network 13. The AP 11 is operatively connected to the core network 13. The core network 13 is in turn operatively connected to a service network 14. The service network may be an Internet Protocol (IP) based service network, such as the Internet. The STAs 12a-d are thereby enabled to access content and services as provided by the IP based service network 14. For simplicity of this disclosure the communications network 10 of FIG. 1 comprises just a single AP 11. However, as is understood by the skilled person, the communications network 10 may comprise a plurality of APs 11, where in turn, a plurality of STAs 12a-d is operatively connected to each AP 11.

Further, the geographical distances between the AP 11 and the STAs 12a, 12b are schematically illustrated as d1 and d2, respectively. According to the illustrative example of FIG. 1, STA 12a is thus located closer to the AP 11 than STA 12b, i.e., d1<d2.

The communications network 10 may be a wireless local area network (WLAN). The WLAN may be compliant with some IEEE 802.11 standard, such as the emerging IEEE 802.11ax standard. In WLANs basic access to the communications channel is based on carrier sense multiple access with collision avoidance (CSMA/CA). When the access to the communications channel is handled in a completely distributed fashion, this is referred to as a distributed coordination function (DCF). This means that all STAs, as well as the AP, contend for the communications channel. Here the notation STA is used for all radio transceiver devices not being an AP, although formally within IEEE standardization all such devices are STAs, also the AP. A STA not being an AP is then formally denoted a non-AP STA. However, to simplify the terminology and without introducing any ambiguity, the less formal terminology is used throughout this disclosure. There are also possibilities for a more centralized channel access scheme where the AP polls the different STAs, and in addition it is possible to combine the DCF with more centralized scheme in a hybrid manner, referred to as a hybrid coordination function, HCF.

However, as noted above, there is no common reference clock in non-cellular communications networks, such as in the wireless local area network 10, to use for synchronization in time.

At least some of the herein disclosed embodiments are therefore based on introducing a process involving the AP 11 to, from responses received from the STAs 12a-d, enable mutual time synchronization between the AP 11 and the STAs 112a-d. This process may be performed before data transmission between the AP 11 and the STAs 12a-d. As there is no common reference clock, the synchronization may be different for different STAs 12a-d.

The embodiments disclosed herein thus relate to time synchronization of STAs 12a-d in a wireless local area network 10. In order to obtain such time synchronization there is provided an AP 11, a method performed by the AP 11, a computer program comprising code, for example in the form of a computer program product, that when run on a processing unit of the AP 11, causes the AP 11 to perform the method. In order to obtain such synchronization there is further provided a STA 12a-d, a method performed by the STA 12a-d, and a computer program comprising code, for example in the form of a computer program product, that when run on a processing unit of the STA 12a-d, causes the processing unit to perform the method.

Figure 2A:
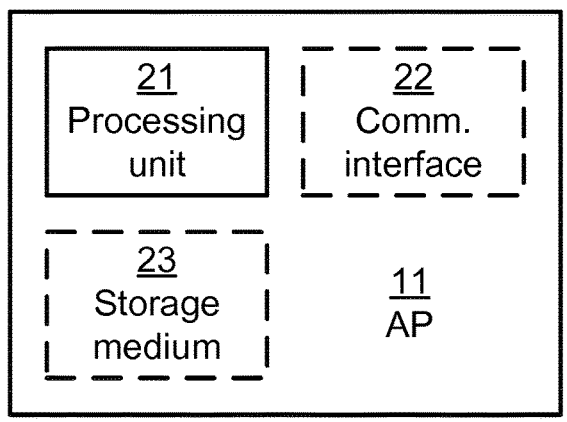
FIG. 2a is a schematic diagram showing functional units of an access point according to an embodiment.

FIG. 2a schematically illustrates, in terms of a number of functional units, the components of an AP 11 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41a (as in FIG. 4), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The AP 11 may further comprise a communications interface 22 for communications with the core network 13 and at least two STAs 12a-d. As such the communications interface 22 may comprise one or more transmitters and receivers, comprising analogue and digital components and a suitable number of antennas for wireless communications and ports for wireline communications. The processing unit 21 controls the general operation of the AP 11 e.g. by sending data and control signals to the communications interface 22 and the storage medium 23, by receiving data and reports from the communications interface 22, and by retrieving data and instructions from the storage medium 23. Other components, as well as the related functionality, of the AP 11 are omitted in order not to obscure the concepts presented herein.

Figure 2B:
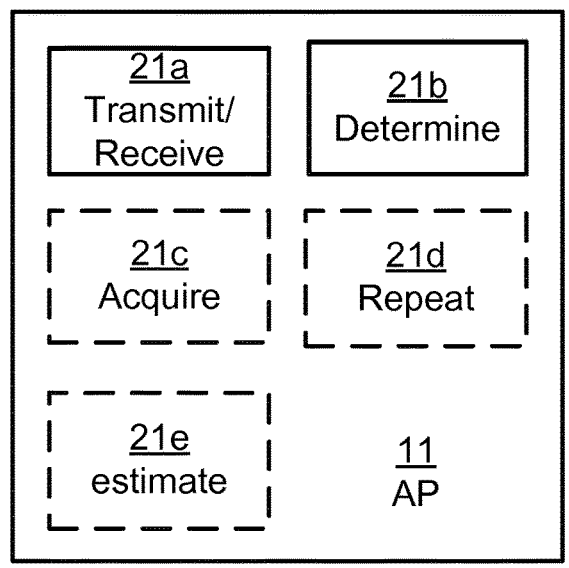
FIG. 2b is a schematic diagram showing functional modules of an access point according to an embodiment.

FIG. 2b schematically illustrates, in terms of a number of functional modules, the components of an AP 11 according to an embodiment. The AP 11 of FIG. 2b comprises a number of functional modules; a transmit and/or receive module 21a configured to perform below steps S102a, S102b, S102c, S104, S106, S110, S112, and a determine module 21b configured to perform below steps S108, S108c. The AP 11 of FIG. 2b may further comprises a number of optional functional modules, such as any of an acquire module 21c configured to perform below step S102d, a repeat module 21d configured to perform below step S104a, and an estimate module 21e configured to perform below steps S108a, S108b. The functionality of each functional module 21a-e will be further disclosed below in the context of which the functional modules 21a-e may be used. In general terms, each functional module 21a-e may be implemented in hardware or in software. Preferably, one or more or all functional modules 21a-e may be implemented by the processing unit 21, possibly in cooperation with functional units 22 and/or 23. The processing unit 21 may thus be arranged to fetch, from the storage medium 23, instructions as provided by a functional module 21a-e and to execute these instructions, thereby performing any steps as will be disclosed hereinafter.

Figure 3A:
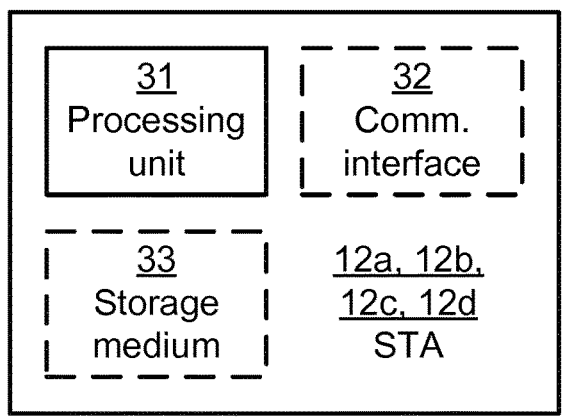
FIG. 3a is a schematic diagram showing functional units of a station according to an embodiment.

FIG. 3a schematically illustrates, in terms of a number of functional units, the components of a STA 12a-d according to an embodiment. A processing unit 31 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41b (as in FIG. 4), e.g. in the form of a storage medium 33. Thus the processing unit 31 is thereby arranged to execute methods as herein disclosed. The storage medium 33 may also comprise persistent storage, which, for example, can be any single one or combination of magnetic memory, optical memory, solid state memory or even remotely mounted memory. The STA 12a-d may further comprise a communications interface 32 for communications with at least one AP 11, and optionally at least one other STA 12a-d. As such the communications interface 32 may comprise one or more transmitters and receivers, comprising analogue and digital components and a suitable number of antennas for wireless communications and ports for wireline communications. The processing unit 31 controls the general operation of the STA 12a-d e.g. by sending data and control signals to the communications interface 32 and the storage medium 33, by receiving data and reports from the communications interface 32, and by retrieving data and instructions from the storage medium 33. Other components, as well as the related functionality, of the STA 12a-d are omitted in order not to obscure the concepts presented herein.

Figure 3B:
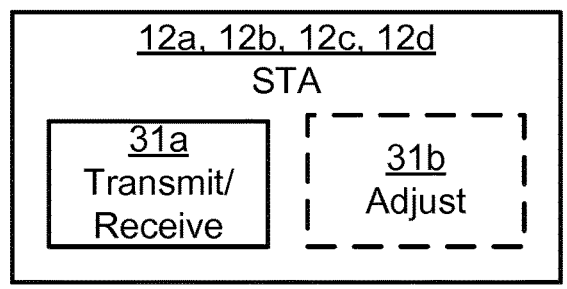
FIG. 3b is a schematic diagram showing functional modules of a station according to an embodiment.

FIG. 3b schematically illustrates, in terms of a number of functional modules, the components of a STA 12a-d according to an embodiment. The STA 12a-d of FIG. 3b comprises a number of functional modules, such as a transmit and/or receive module 31a configured to perform below steps S202a, S202b, S204, S206, S208. The STA 12a-d of FIG. 3b may further comprises a number of optional functional modules, such as an adjust module 31b configured to perform below step S210. The functionality of each functional module 31a-b will be further disclosed below in the context of which the functional modules 31a-b may be used. In general terms, each functional module 31a-b may be implemented in hardware or in software. Preferably, one or more or all functional modules 31a-b may be implemented by the processing unit 31, possibly in cooperation with functional units 32 and/or 33. The processing unit 31 may thus be arranged to fetch, from the storage medium 33, instructions as provided by a functional module 31a-b and to execute these instructions, thereby performing any steps as will be disclosed hereinafter.

Figure 4:
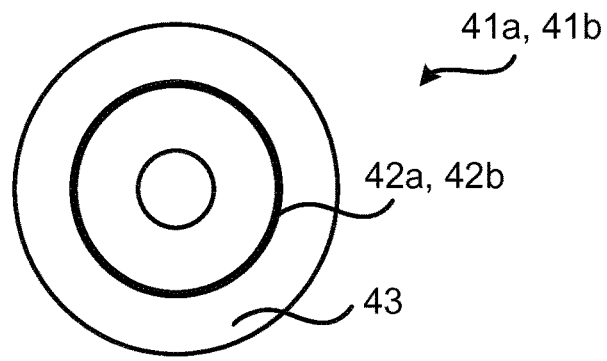
FIG. 4 shows one example of a computer program product comprising computer readable means according to an embodiment.

FIG. 4 shows one example of a computer program product 41a, 41b comprising computer readable means 43. On this computer readable means 43, a computer program 42a can be stored, which computer program 42a can cause the processing unit 21 and thereto operatively coupled entities and devices, such as the communications interface 22 and the storage medium 23, to execute methods according to embodiments described herein. The computer program 42a and/or computer program product 41a may thus provide means for performing any steps of the AP 11 as herein disclosed. On this computer readable means 43, a computer program 42b can be stored, which computer program 42b can cause the processing unit 31 and thereto operatively coupled entities and devices, such as the communications interface 32 and the storage medium 33, to execute methods according to embodiments described herein. The computer program 42b and/or computer program product 41b may thus provide means for performing any steps of the STA 12a-d as herein disclosed.

In the example of FIG. 4, the computer program product 41a, 41b is illustrated as an optical disc, such as a CD (compact disc) or a DVD (digital versatile disc) or a Blu-Ray disc. The computer program product 41a, 41b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 42a, 42b is here schematically shown as a track on the depicted optical disk, the computer program 42a, 42b can be stored in any way which is suitable for the computer program product 41a, 41b.

Figure 5:
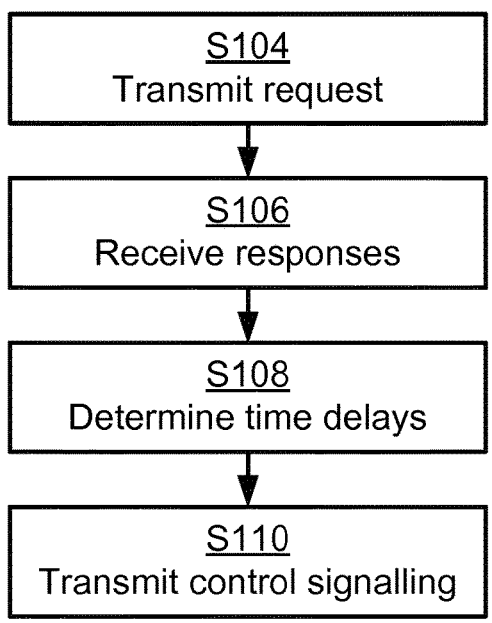
Figure 7:
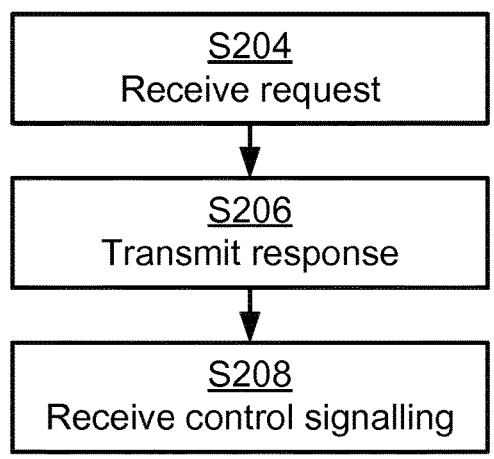
Figure 8:
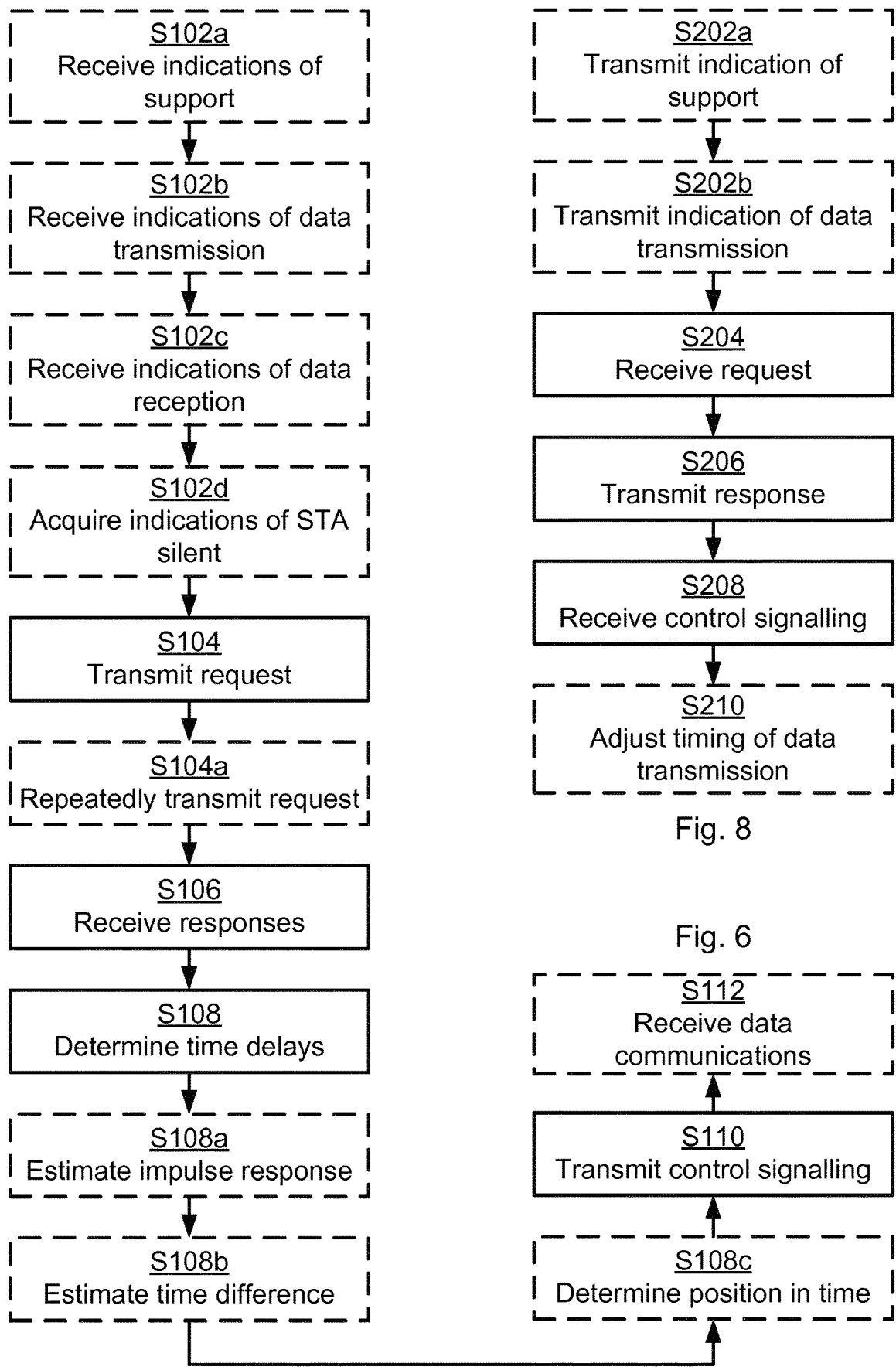

FIGS. 5 and 6 are flow charts illustrating embodiments of methods for time synchronization of STAs 12a-d in a wireless local area network 10 as performed by the AP 11. FIGS. 7 and 8 are flow charts illustrating embodiments of methods for time synchronization of a STA 12a-d in a wireless local area network 10 as performed by the STA 12a-d. The methods are advantageously provided as computer programs 42a, 42b.

Reference is now made to FIG. 5 illustrating a method for time synchronization of STAs 12a-d in a wireless local area network 10 as performed by the AP 11 according to an embodiment.

The synchronization of STAs 12a-d in a wireless local area network 10 is based on the AP 11 receiving information from the STAs 12a-d. In order for the AP 11 to receive the information it transmits a request to the STAs. Hence, the AP 11 is configured to, in a step S104, transmit a request to at least two STAs 12a-d for the at least two STAs 12a-d to transmit a response to the AP 11. The request indicates which frequency sub-band each of the at least two STAs 12a-d is to use for transmitting the response. The AP 11 will thereby know in which frequency sub-band it should receive a response from a particular STA 12a-d. Further aspects of the request and the information provided in the request will be presented below.

Although only one of the STAs 12a-d, or even none of the STAs 12a-d may respond to the request, it is for sake of completeness assumed that the at least two STAs 12a-d receive and respond to the request. This will be further disclosed in steps S204 and S206 below. Hence, the AP 11 is configured to, in a step S106, receive the responses to the request from the at least two STAs 12a-d. Each of the responses comprises orthogonal frequency-division multiple access (OFDMA) symbols.

The AP 11 then uses the received responses to determine time delays. Particularly, the AP 11 is configured to, in a step S108, determine, for each of the at least two STAs 12a-d, a time delay based on the responses. Further details of how the time delays may be determined will be presented below.

The request as transmitted in step S104 may thus trigger a selected set of STAs 12a-d to send a signal (response) that by the AP 11 can be used for (relative) time estimation of the STAs 12a-d. This implies that no STA 12a-d needs to be aligned in time with the AP 11 until it will be requested to send uplink data to the AP 11. Once the AP 11 has determined the time delays (such as one time delay for each STA 12a-d from which a response is received in step S106) the AP may determine control signalling so as to synchronize transmission from the at least two STAs 12a-d in time. Thus, the AP 11 is configured to, in a step S110, transmit control signalling to the at least two STAs 12a-d. The control signalling comprises time alignment commands for the at least two STAs 12a-d. Each time alignment command is based on the time delay for one of the at least two STAs 12a-d. Further details of how the time alignment commands may be determined will be presented below.

Embodiments relating to further details of synchronization of STAs 12a-d as performed by the AP 11 will now be disclosed.

Reference is now made to FIG. 6 illustrating methods for time synchronization of STAs 12a-d in a wireless local area network 10 as performed by the AP 11 according to further embodiments.

The synchronization of STAs 12a-d in the wireless local area network 10 may be regarded as comprising four phases. Embodiments relating to each one of these phases will be presented next.

Phase 1: Control Downlink Initiation

The first phase (Phase 1) relates to further details of the request transmitted to at least two STAs 12a-d in step S104 and how the AP 11 may transmit such a request.

The request transmitted by the AP 11 in step S104 may be regarded as initiating the first phase. The request transmitted in step S104 may be a control frame transmitted in a Beacon frame or a special Poll frame. Such beacon frames may be transmitted periodically. Particularly, the AP 11 may be configured to, in an optional step S104a repeatedly transmit the request according to a repetitive pattern (see below for further details).

The exact contents of this control frame is out of the scope of the present disclosure, except for those properties as herein disclosed; the control frame should comprise information about what STAs 12a-d should reply to the request and the respective sub-bands the replying STAs 12a-d should use in the response to this control frame. Information identifying the STAs 12a-d and the corresponding sub-bands may only be needed during an initial control frame exchange.

As noted above, the responses to the request are by the at least two STAs 12a-d transmitted using OFDMA symbols. As such, each OFDMA symbol may have a cyclic prefix (CP). CPs in the context of OFDMA symbols are as such known in the art and further description thereof is therefore omitted. With reference to the herein disclosed embodiments, each of the responses may comprise a CP. The request as transmitted in step S104 may then comprise instructions to the STAs 12a-d regarding what length of the CP the STAs 12a-d are to use in the responses.

In general terms, AP 11 may determine that the OFDMA symbols to be transmitted by the at least two STAs 12a-d (and as will be received in step S106) will have a longer CP than OFDMA symbols used by the at least two STAs 12a-d for data traffic. For example the CP in the responses may have a length that is X times the length of the CP used for data traffic. Reasonable values of X are 1.5, 2, . . . , 5. Such a longer CP length may be used to accommodate STAs 12a-d with different propagation delays and channel conditions since the STAs 12a-d are not time aligned when the responses are transmitted. However, it is also foreseen that X=1 may be used, i.e., without increasing the length of the CP. One reason is that the responses received on the uplink may be considerable more robust than the actual data transmission, and/or that the time delays of the STAs 12a-d may be determined in the presence of some disturbance in the uplink. The embodiments disclosed herein are not limited to any particular length of the CP.

There may be different ways to determine what length of CP shall be used in the responses. Different embodiments relating thereto will now be described in turn.

For example, the length of the CP may be hardcoded in the AP 11. This may correspond to the CP being determined according to a specification.

For example, the length of the CP may depend on earlier training and/or (individual) channel estimates (e.g., from previous iterations of, at least Phase 1 and Phase 2; Phase 2 will be described below). Hence, the length of the CP may depend on previously received responses from the at least two STAs 12a-d.

There may be different ways to determine to which STAs 12a-d the request is to be sent in step S104. Different embodiments relating thereto will now be described in turn.

For example, the request may be transmitted to STAs 12a-d supporting training. That is, the AP 11 may be configured to, in an optional step S102a, receive indications from the at least two STAs 12a-d that the at least two STAs 12a-d support reception of time alignment commands. The request may then in step S104 be transmitted in response thereto (and hence to the STAs 12a-d supporting reception of time alignment commands). In this respect, a STA 12a-d supporting training should be interpreted as referring to a STA 12a-d supporting reception of control signalling as transmitted by the AP 11 in step S110 and supporting adjustment of timing of data transmission based on the control signalling (see, step S210 below).

For example, the request may be transmitted to STAs 12a-d having data to be transmitted. That is, the AP 11 may be configured to, in an optional step S102b, receive indications from the at least two STAs 12a-d that the at least two STAs 12a-d have uplink data to be transmitted. The request may then in step S104 be transmitted in response thereto (and hence to the STAs 12a-d having data to be transmitted).

For example, the request may be transmitted to STAs 12a-d having data to be received. That is, the AP 11 may be configured to, in an optional step S102c, receive indications that downlink data is to be transmitted to the at least two STAs 12a-d. Such indications may be received from the core network 13 or from another AP 11. The request may then in step S104 be transmitted in response thereto (and hence to the STAs 12a-d having data to be received).

For example, the request may be transmitted to STAs 12a-d that are silent. A STA 12a-d being silent may indicate that the STA 12a-d is out of time synchronization with the AP 11. That is, the AP 11 may be configured to, in an optional step S102d, acquire indications that the at least two STAs 12a-d have remained silent during a period of time. The request may then in step S104 be transmitted in response thereto (and hence to the STAs 12a-d being silent).

If the control frame is transmitted as a repetitive pattern, say in the order of every looms, intended to the very same STAs 12a-d (for example already engaged in transmission), neither information about STAs 12a-d nor sub-bands may be needed. Information about what STAs 12a-d and what sub-bands 12a-d to use for a respective STA 12a-d can also be agreed on beforehand assuming that the AP and the STA already have established a connection.

The term "frequency sub-band" may denote a set of sub-carriers. This set of sub-carriers may be adjacent, so it can be seen as a "frequency band", but the sub-carriers may also be spread out so that the sub-carriers for an individual STA 12a-d are not adjacent to one another. That is, each sub-band may denote a set of adjacent or interleaved sub-carriers. The term sub-band should henceforth be understood to include all arrangements of a set of sub-carriers.

Phase 2: Response Uplink Signalling

The second phase (Phase 2) relates to further details of the responses received by the AP 11 in step S106 and how the AP 11 may receive such responses. The second phase further relates to how the AP 11 may determine time delays for the at least two STAs as in step S108.

As will be further disclosed below, the at least two STAs 12a-d, upon reception of the request transmitted in step S104, respond to the AP 11. These responses are by the AP 11 received in step S106. That is, following the control frame transmitted in the downlink from the AP 11 (that initiates Phase 1), the at last two STAs 12a-d will transmit their responses simultaneously in the uplink. Each STA 12a-d may transmit packets, or frames, where the entire preamble (Legacy Short Training Field and Legacy Long Training Field) is transmitted over the full bandwidth. The purpose is to synchronize the receiver in the AP 11 (to some of the received responses, e.g. the strongest). The remaining part of the responses are then formed such that different STAs 12a-d are transmitting on different parts of the frequency band, i.e. in different sub-bands using different sub-carriers. Each STA 12a-d may then thus transmit pilot symbols in each assigned sub-band. In further detail, each of the responses may thus comprise a preamble part and a symbol part, and the preamble part of each of the responses is by the AP 11 received over full bandwidth of the wireless local area network 10. The symbol part of each of the responses is then by the AP 11 received in one of the frequency sub-bands (i.e., in each respective sub-band of each respective STA 12a-d). Alternatively, each of the responses comprises a preamble part and a symbol part, and both the preamble part and the symbol part of the responses are by the AP 11 received in the respective indicated frequency sub-bands of the at least two STAs 12a-d.

As noted above, the responses are by the at least two STAs 12a-d transmitted using OFDMA symbols. The sub-band for each of the at least two STAs 12a-d may be changed between adjacent OFDM symbols. That is, which frequency sub-band each of the at least two STAs 12a-d is to use for transmitting the response may change between symbols in the responses. This may improve frequency diversity and could provide the AP 11 more information about the channel conditions (than if the STAs 12a-d do not change sub-band when transmitting the symbols). Information obtained from reception of symbols in different frequency sub-bands from the same STA 12a-d over time could further be used to determine the most suitable sub-band for each STA 12a-d to use for the responses in a further occurrence, repetition, or iteration, of Phase 2.

There may be different ways for the AP 11 to determine the time delays of the STAs 12a-d. Different embodiments relating thereto will now be described in turn.

For example, the AP 11 may estimate a time differences between concurrent transmissions (receptions) of STAs 12a-d based on impulse responses of the channel per sub-band.

For example, determining the time delay may require the AP 11 to be configured to, in an optional step S108a, estimate a channel impulse response for each of the received responses from the STAs 12a-d. Further, determining the time delay may require the AP 11 to be configured to, in an optional step S108b, estimate a time difference between concurrent transmission of the responses from the at least two STAs 12a-d based on the estimated channel impulse responses. The estimation may be based on known reference symbols and with common synchronization in time domain for the complete bandwidth of the wireless local area network 10 (i.e., the bandwidth used by the AP 11). Hence, estimating the time difference may require the AP 11 to be configured to, in an optional step S108c, determine a position in time for known reference symbols comprised in the responses by finding a first occurrence of an amplitude peak in the channel impulse responses, wherein the amplitude peak is associated with at least one of the known reference symbols.

In more detail, the composite signal (i.e., a signal comprising all responses from the at least two STAs 12a-d) may be utilized by the AP to perform time estimation. The AP 11 may use the preamble part in the composite signal for time synchronization. The AP 11 could perform a search, in the time domain, for the first amplitude peak (in case of many), not the strongest. This amplitude determines the time synchronization of the composite signal. With this time synchronization at hand, the AP 11 may perform a Fast Fourier Transform (FFT) on the composite signal, which allows the different responses from the individual at least two STAs 12a-d to be distinguished. That is, the AP 11 may first need to synchronize to the composite signal in the time domain (over the whole bandwidth) to be able to place the FFT window. The placement of the FFT window will thereby act as a common synchronization for all sub-bands. Once the different responses from the individual at least two STAs 12a-d have been distinguished, the individual time delays may be found from the positions of the amplitude peaks in the individual channel impulse responses from the STAs 12a-d, see description of FIG. 9 below. With the preamble time synchronization at hand, the AP 11 may thus perform an FFT on the rest of the received signal from which the AP 11 estimates the channel impulse responses for each STA 12a-d. With these at hand, the AP 11 may apply a time offset estimation mechanism as described below.

Assume that there are M sub-bands to be used for the responses on the uplink. As noted above, each STA 12a-d is assigned a unique sub-band, hereinafter denoted i, to transmit OFDMA symbols $p_k^i$ for the different sub-bands (sub-carriers). As noted above, each sub-band may denote a set of adjacent or interleaved sub-carriers. An example of a mapping where each sub-band denotes a set of adjacent sub-carriers, the sub-carriers could be allocated from the lowest index to the highest index, i.e., $$k = \frac{iN}{M}, \dots, \frac{(i+1)N}{M} - 1,$$

where N is the total number of sub-carriers and i=0, 1, ..., M−1. An example of a mapping where each sub-band denotes a set of interleaved sub-carriers is where STA 12a is allocated sub-carriers 0, N/M−1, 2N/M−1, ..., and where STA 12b is allocated sub-carriers 1, N/M, 2N/M, ..., etc.

The time domain sequence of the symbols is created by inserting the symbols at the predetermined sub-carrier locations in the inverse Fast Fourier Transform (IFFT) with the remaining sub-carriers set to zero. The resulting sequence of symbols may be appended after the Legacy Short Training Field (L-STF) and the Legacy Long Training Field (L-LTF) to create the time domain signal.

The generated time domain signal for each OFDMA symbol comprising pilot symbols, for sub-band i, can be expressed as $$s_i(t) = \frac{1}{N} \sum_{k=iN/M}^{\frac{(i+1)N}{M}-1} p_k^i e^{\frac{j2\pi tk}{N}}, \quad -N_{CP} \leq t \leq N-1,$$

where $N_{CP}$ is the number of samples in the CP.

For simplicity of description of this disclosure but without limitation, it is assumed that the STAs 12a-d have a single antenna in line-of-sight conditions, i.e., one-tap channels. The inventive concept presented herein still holds for multipath channels (i.e., more than one transmission path between the sender (i.e., one of the STAs 12a-d) and the receiver (i.e., the AP 11)). The signal received at the AP 11 at time t thus becomes $$r(t) = \Sigma_i^{M-1} h_i s_i(t-\tau_i) + n,$$

where, for link i, $h_i$ is the channel coefficient, $\tau_i$ is the propagation delay in units of samples and n represents additive white Gaussian noise; that is $n \sim N(0,\sigma^2)$.

Upon reception of the responses the AP 11 may perform synchronization as is known in the art (e.g., based on L-STF and L-LTF) and place the FFT window to transform the received responses into the frequency domain. It may, without loss of generality, be assumed that $\tau_0 \leq \tau_1 \leq \ldots \leq \tau_{M-1}$ and that the FFT window is placed according to the tap with delay $\tau_0$.

The received symbol $y_k^i$ (in frequency domain) for sub-band i and subcarrier k may be expressed as follows $$y_k^i = \begin{cases} h_i p_k^i + n, & i = 0, \\ e^{j2\pi k(\tau_i - \tau_0)/N} h_i p_k^i + n, & 0 < i \leq M-1. \end{cases}$$

The AP 11 may then determines a channel estimation $\hat{h}_k^i$ for each sub-band as follows $$\hat{h}_k^i = \frac{y_k^i}{p_k^i} = e^{j2\pi k(\tau_i - \tau_0)/N} h_i + \tilde{n}, \quad k = \frac{iN}{M}, \ldots, \frac{(i+1)N}{M} - 1.$$

The AP 11 may then take the N-point IFFT on each sub-band to find the time delay for each sub-band according to $$f_i(t) = \mathcal{F}^{-1}\{\hat{h}_k^i\} = \frac{\frac{M}{N}\sin\left(\frac{\pi(t-(\tau_i-\tau_0))}{M}\right)}{\sin\left(\frac{\pi(t-(\tau_i-\tau_0))}{N}\right)},$$

where $f_i(\tau_i - \tau_0) = \frac{M}{N}$.

In the above expression it has for simplicity been assumed that $h_i = 1$.

The thus estimated time delays of the channel impulse responses of the at least two STAs 12a-d will be in units of samples and the accuracy will depend on the FFT size; higher bandwidth generally yields better resolution in time.

The taps in the N-point IFFT may then be identified by separating the taps from the noise floor. It is assumed that such a number of OFDM symbols have been received by the AP 11 in step S106 such that the AP is able to perform filtering of the channel estimates before applying the IFFT.

Figure 9:
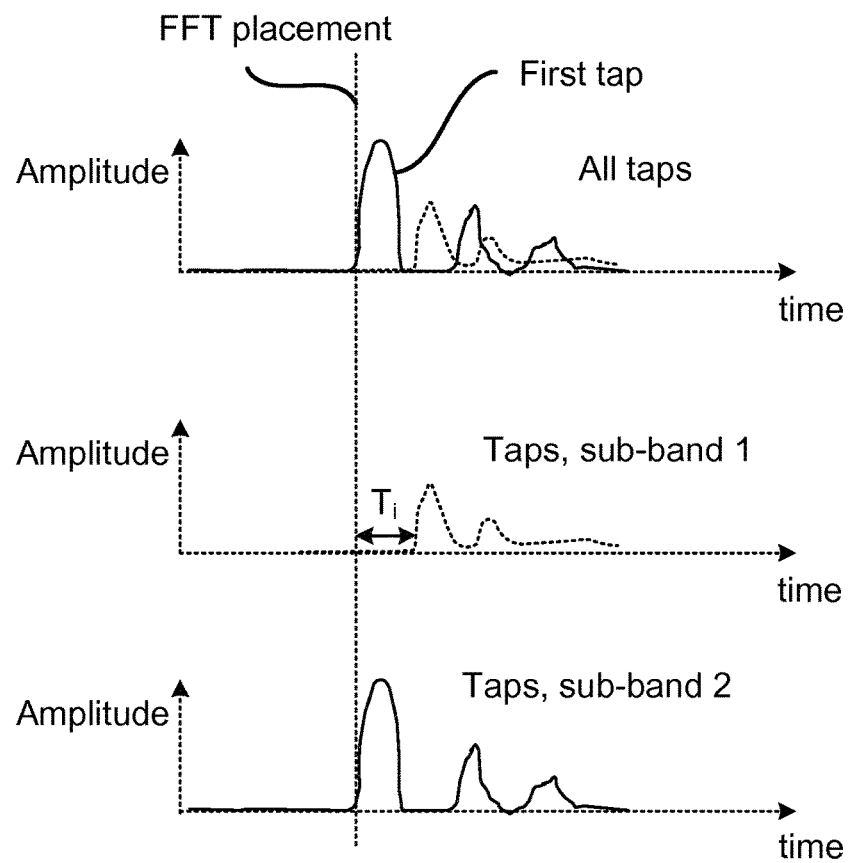
FIG. 9 is a schematic illustration of channel taps in a signal received by the access point from the stations according to embodiments.

FIG. 9 schematically illustrates an example of a channel and its impulse response (or power delay profile) for the full bandwidth signal as well as the separated taps for each sub-band (sub-band 1 and sub-band 2, respectively) after each respective individual time delay for the individual STAs 12a-d. In the schematic illustrative example of FIG. 9 a total of five taps are shown; two taps for sub-band 1 and three taps for sub-band 2. FIG. 9 illustrates a multipath channel and is more general than the above analysis (assuming one tap or path). The x-axis indicates time and the y-axis indicates signal strength (amplitude or power) of the tap.

Phase 3: Control Downlink Signalling

The third phase (Phase3) relates to further details of the control signalling transmitted by the AP 11 in step S110 and how the AP 11 may transmit such control signalling.

Thus far the AP 11 has estimated the delays for the at least two STAs 12a-d and also the channel impulse responses for the at least two STAs 12a-d, as indicated in FIG. 9 (as described above). The AP 11 may then transmit a command, as in step S110, to the at least two STAs 12a-d to adjust their transmit timing in order to align the signals as received by the AP 11 from the STAs 12a-d. In more detail, when the AP 11 has estimated the delay for each STA 12a-d according to the FFT placement (i.e., for a tap with time delay $\tau_0$) the AP 11 may transmit such timing advance commands in the downlink for each STAs 12a-d, as in step S110. The at least two STAs 12a-d should thus follow these timing advance commands when transmitting further uplink transmissions to the AP 11.

The control signalling may comprise instructions regarding the length of the CP that the at least two STAs 12a-d are to use during data communications with the AP 11.

There may be different ways for the AP to determine this length of the CP to be used by the at least two STAs 12a-d. For example, a shorter CP may be used for data than for control. That is, the CP used by the at least two STAs 12a-d for the data communications may have shorter length than the CP used by the at least two STAs 12a-d for transmitting the responses as received by the AP 11 in step S106.

For example, the length of the CP may be dependent on the estimated channel impulse response. In principle, since the channel impulse response has been estimated by the AP 11, and the required length of the CP generally depends on the duration of the channel impulse response of the channel, the AP 11 may set a suitable length of the CP to be used in the uplink from the at least two STAs 12a-d to the AP 11 based on the estimated channel impulse response.

It could also be so that the length of the CP is set not only based on the channel impulse response but also based on how well the at least two STAs 12a-d can be synchronized. The length of the CP may additionally or alternatively be adjusted based on the tap statistics and the time delay estimates. Particularly, the length of the CP may thus be based on how well the at least two STAs 12a-d can be synchronized, according to the tap statistics, and/or according to the time delay estimates. These are all examples of relations between the determined time delays of the at least two STAs 12a-d. Hence, the length of the CP for the data communications may be dependent on such a relation between the determined time delays of the at least two STAs 12a-d. For example, a low spread in time between the time delays of the individual STAs 12a-d may result in a shorter CP than if a high spread in time between the time delays of the individual STAs 12a-d has been found. If for some reason the synchronization is not so good, a longer CP can be used. That is, a high level of synchronization may result in shorter CP than for a low level of synchronization, etc.

Further, based on the result of the estimation as performed in Phase 2, the AP 11 may determine to exclude at least some of the at least two STAs 12a-d from further transmission to the AP, at least for a limited time duration. One example is when the estimated taps are too weak (in terms of energy) in relation to the noise floor. Additionally, if a STA 12a-d does not respond to the request as transmitted in step S104 the AP 11 may not be able to determine the correct control signalling to it and hence determine to exclude this STA 12a-d. Hence, the control signalling may comprise instructions for at least one of the at least two STAs 12a-d to refrain from communicating with the AP 11.

Phase 4: Further Uplink Communications

The fourth phase (Phase4) relates to further communications between the AP 11 and the at least two STAs 12a-d, and particularly further transmissions from the at least two STAs 12a-d to the AP 11. As disclosed above, at least some of the at least two STAs 12a-d may be instructed not to participate in Phase 4.

In general terms, each of the at least two STAs 12a-d will transmit according to the timing advance, sub-band and CP as signalled by the AP 11 as in step S110. The AP 11 may, for example, receive data communications from the at least two STAs 12a-d. Particularly, the AP 11 may be configured to, in an optional step S112, receive data communications based on the time alignment commands from the at least two STAs 12a-d.

There may be different ways for the at least two STAs 12a-d to transmit the data communications (and hence for the AP 11 to receive this data communications as in step S112). For example, the data communications may be received by the AP 11 using multi-user multiple input multiple output (MU-MIMO) reception. For example, the data communications may be received by the AP 11 using multi-user orthogonal frequency-division multiple access multiple input multiple output (MU-OFDMA-MIMO) reception. Thus, the data communications between the STAs 12a-d and the AP 11 may use MU-MIMO transmission and reception.

Reference is now made to FIG. 7 illustrating a method for time synchronization of a STA 12a-d in a wireless local area network 10 as performed by the STA 12a-d according to an embodiment.

As noted above, the AP in a step S104 transmits a request for the STAs 12a-d to respond to. It is assumed that this request is received by the STA 12a-d. Hence the STA 12a-d is configured to, in a step S204, receive a request from the AP 11 for the STA 12a-d to transmit a response to the AP. As disclosed above, the request indicates which frequency sub-band the STA 12a-d is to use for transmitting the response.

The STA 12a-d then responds to the request by transmitting a response in the thus indicated frequency sub-band. Hence the STA 12a-d is configured to, in a step S206, transmit the response to the AP 11 in the indicated frequency sub-band. As disclosed above, the response comprises OFDMA symbols.

As noted above, this response is by the AP 11 received in a step S106. The AP 11 then determines and transmits time alignment commands for the STAs from which responses are received. It is assumed that the control signalling as transmitted by the AP 11 in step S110 is received by the STA 12a-d. Hence, the STA 12a-d is configured to, in a step S208, receive control signalling from the AP 11. As disclosed above, the control signalling comprises a time alignment command for the STA 12a-d, wherein the time alignment command is based on a time delay for the STA 12a-d determined based on the response transmitted by the STA 12a-d.

Embodiments relating to further details of synchronization of a STA 12a-d in a wireless local area network 10 will now be disclosed.

Reference is now made to FIG. 8 illustrating methods for time synchronization of a STA 12a-d in a wireless local area network 10 as performed by the STA 12a-d according to further embodiments.

There may be different ways for the STA 12a-d to handle and react to the control signalling as received in step S208. For example the STA 12a-d may adjust its transmission by applying the received time alignment command. That is, the STA 12a-d may be configured to, in an optional step S210, adjust timing of data transmission based on the received control signalling.

As noted above, there may be different ways to determine to which STAs 12a-d the request is to be sent in step S104. As further noted above, the request may, for example, be transmitted to those STAs 12a-d that support training. Therefore, the STA 12a-d may be configured to, in an optional step S202a, transmit an indication to the AP 11 that the STA 12a-d supports reception of time alignment commands. The request in step S104 may then be received in response thereto.

As further noted above, the request may, for example, be transmitted to those STAs 12a-d that have data to be transmitted. Therefore, the STA 12a-d may be configured to, in an optional step S202b, transmit an indication to the AP 11 that the STA 12a-d has uplink data to be transmitted. The request in step S104 may then be received in response thereto.

As noted above, the response may comprise a CP. As further noted above, the request as received in step S204 from the AP 11 may comprise instructions regarding the length of the CP for the STA 12a-d to use in the response transmitted in step S206.

As noted above, the response may comprise a preamble part and a symbol part. The preamble part of the response may then be transmitted by the STA 12a-d over full bandwidth of the wireless local area network 10. The STA 12a-d may transmit the symbol part of the response in the indicated frequency sub-band. Alternatively, the STA 12a-d may transmit both the preamble part and the symbol part of the response in the indicated frequency sub-band.

As noted above, which frequency sub-band the STA 12a-d is to use for transmitting the response may change between symbols in the response.

As noted above, the control signalling as transmitted by the AP in a step S110, and as received by the STA 12a-d in a step S208 may comprise instructions regarding the length of the CP that is to be used by the STA 12a-d during data communications with the AP 11.

Figure 10:
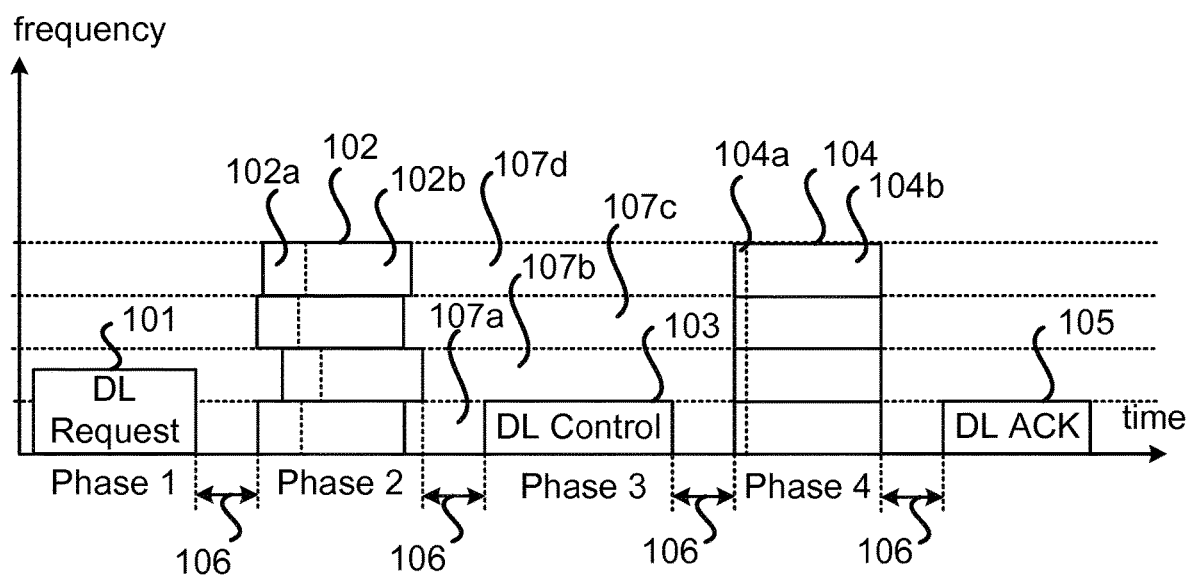
FIG. 10 is a schematic illustration of frames transmitted between an access point and stations according to embodiments.

FIG. 10 is a schematic illustration of frames transmitted between the AP and four STAs 12a-d according to at least some of the herein disclosed embodiments.

The AP 11 in Phase 1 transmits a downlink request 101 as in step S104. This request is by the STAs 12a-d received as in step S204.

After a Short Interframe Space (SIFS) 106 the STAs 12a-d in Phase 2 transmit responses 102 to the AP 11 as in step S106. In general terms, the SIFS may be defined as the amount of time required for a wireless interface to process a received frame and to respond with a response frame. In the present example the SIFS may thus denote the difference in time between the first symbol of the response frame 102 in the air and the last symbol of the request frame 101 in the air.

Each response comprises a CP 102a and an OFDM symbol 102b. Each response is transmitted in a respective sub-band 107a, 107b, 107c, 107d. Thus, STA 12a transmits its response 102 in sub-band 107a, STA 12b transmits its response 102 in sub-band 107b, and so on. These responses are received by the AP 11 as in step S106.

The AP 11 then in Phase3 determines time alignment commands and transmits downlink control signalling 103 to the STAs 12a-d. This downlink control signalling is received by the STAs 12a-d as in step S208.

The STAs 12a-d then in Phase4 adjust their timing of data transmission based on the control signalling as in step S210 and may transmit data communications frames 104 based on the time alignment command. The data communications frames comprise a CP 104a and an OFDM symbol 104b. The CP 104a may be shorter than the CP 102a. These data communications frames are then received by the AP 11 as in step S112. The reception of the data communications frames is acknowledged by the AP 11 transmitting a downlink acknowledgement message 105.

Although signalling from the AP 11 in FIG. 1 schematically has been indicated as occurring in sub-band 107a, it is understood that the signalling from the AP 11 may utilize all or any of the sub-bands 107a-d. Further, as noted above, a STA 12a-d may not be constrained to use a sub-band having a fixed location in frequency over time, each sub-band may denote a set of adjacent or interleaved sub-carriers and hence the frequency location of the responses 102 from a STA 12a-d may shift over time.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for time synchronization of stations (STAs) in a wireless local area network, the method being performed by an access point (AP) the method comprising the steps of:
receiving indications that downlink data is to be transmitted to at least two STAs;
responsive to receiving the indications, transmitting a request to the at least two STAs for the at least two STAs to transmit a response to the AP, the request indicating which frequency sub-band each of the at least two STAs is to use for transmitting the response;
receiving the responses to the request from the at least two STAs, wherein each of the responses comprises orthogonal frequency-division multiple access (OFDMA) symbols;
determining, for each of the at least two STAs, a time delay based on the responses; and
transmitting control signalling to the at least two STAs, the control signalling comprising time alignment commands for the at least two STAs, wherein each time alignment command is based on the time delay for one of the at least two STAs.

2. The method according to claim 1, wherein the request is transmitted in a beacon frame or a poll frame.

3. The method according to claim 1, further comprising:
receiving indications from the at least two STAs that the at least two STAs support reception of the time alignment commands, and wherein the request is transmitted in response thereto.

4. The method according to claim 1, further comprising:
receiving indications from the at least two STAs that the at least two STAs have uplink data to be transmitted, and wherein the request is transmitted in response thereto.

5. The method according to claim 1, further comprising:
acquiring indications that the at least two STAs have remained silent during a period of time, and wherein the request is transmitted in response thereto.

6. The method according to claim 1, further comprising:
repeatedly transmitting the request according to a repetitive pattern.

7. The method according to claim 1, wherein each sub-band denotes a set of adjacent or interleaved sub-carriers.

8. The method according to claim 1, wherein each of the responses comprises a cyclic prefix (CP) and wherein the request comprises instructions regarding length of the CP to be used in the responses.

9. The method according to claim 8, wherein the length of the CP is determined according to a specification.

10. The method according to claim 8, wherein the length of the CP depends on previously received responses from the at least two STAs.

11. The method according to claim 1, wherein each of the responses comprises a preamble part and a symbol part, and wherein the preamble part of each of the responses is received over full bandwidth of the wireless local area network.

12. The method according to claim 1, wherein each of the responses comprises a preamble part and a symbol part, and wherein both the preamble part and the symbol part of the responses are received in respective indicated frequency sub-bands of the at least two STAs.

13. The method according to claim 11, wherein the symbol part of each of the responses is received in one of the frequency sub-bands.

14. The method according to claim 13, wherein which frequency sub-band each of the at least two STAs is to use for transmitting the response changes between symbols in the responses.

15. The method according to claim 1, wherein determining the time delay comprises:
estimating a channel impulse response for each of the received responses; and
estimating a time difference between concurrent transmission of the responses from the at least two STAs based on the estimated channel impulse responses.

16. The method according to claim 15, wherein estimating the time difference comprises:
determining a position in time for known reference symbols comprised in the responses by finding a first occurrence of an amplitude peak in the estimated channel impulse responses, wherein the amplitude peak is associated with at least one of the known reference symbols.

17. The method according to claim 1, wherein the control signalling comprises instructions regarding length of cyclic prefix (CP) for the at least two STAs to use during data communications with the AP.

18. The method according to claim 8, wherein the CP used during data communications with the AP has a shorter length than the CP to be used in the responses.

19. The method according to claim 8, wherein the length of the CP for the data communications is dependent on estimated channel impulse responses for each of the received responses.

20. The method according to claim 17, wherein the length of the CP for the data communications is dependent on a relation between the determined time delays of the at least two STAs.

21. The method according to claim 1, wherein the control signalling comprises instructions for at least one of the at least two STAs to refrain from communicating with the AP.

22. The method according to claim 1, further comprising:
receiving data communications based on the time alignment commands from the at least two STAs.

23. The method according to claim 22, wherein the data communications is received using multi-user multiple input multiple output (MU-MIMO) reception.

24. The method according to claim 23, wherein the data communications is received using multi-user orthogonal frequency-division multiple access multiple input multiple output (MU-OFDMA-MIMO) reception.

25. A method for time synchronization of a station (STA) in a wireless local area network, the method being performed by the STA, the method comprising the steps of:
receiving a request from an access point (AP) for the STA to transmit a response to the AP, the request indicating which frequency sub-band the STA is to use for transmitting the response and transmitted by the AP in response to the AP receiving indications that downlink data is to be transmitted to the STA;
transmitting the response to the AP in the indicated frequency sub-band, wherein the response comprises orthogonal frequency-division multiple access (OFDMA) symbols; and
receiving control signalling from the AP, the control signalling comprising a time alignment command for the STA, wherein the time alignment command is based on a time delay for the STA determined based on the response.

26. The method according to claim 25, further comprising:
adjusting timing of data transmission based on said control signalling.

27. The method according to claim 25, further comprising:
transmitting an indication that the STA supports reception of the time alignment command, and wherein the request is received in response thereto.

28. The method according to claim 25, further comprising:
transmitting an indication that the STA has uplink data to be transmitted, and wherein the request is received in response thereto.

29. The method according to claim 25, wherein the response comprises a cyclic prefix (CP) and wherein the request comprises instructions regarding length of the CP to be used in the response.

30. The method according to claim 26, wherein the response comprises a preamble part and a symbol part, and wherein the preamble part of the response is transmitted over full bandwidth of the wireless local area network.

31. The method according to claim 26, wherein the response comprises a preamble part and a symbol part, and wherein both the preamble part and the symbol part of the response are transmitted in the indicated frequency sub-band.

32. The method according to claim 30, wherein the symbol part of the response is transmitted in the frequency sub-band.

33. The method according to claim 30, wherein which frequency sub-band the STA is to use for transmitting the response changes between symbols in the response.

34. The method according to claim 25, wherein the control signalling comprises instructions regarding length of cyclic prefix (CP) for the STA to use during data communications with the AP.

35. An access point (AP) for time synchronization of stations (STAs) in a wireless local area network, the AP comprising a processing unit that comprises one or more of a central processing unit (CPU), a multiprocessor, a microcontroller, a digital signal processor (DSP), an application specific integrated circuit (ASIC), and a field programmable gate arrays (FPGA), capable of executing software instructions stored in a computer program product, the processing unit being configured to cause the AP to:
receiving indications that downlink data is to be transmitted to at least two STAs;
responsive to receiving the indication, transmit a request to the at least two STAs for the at least two STAs to transmit a response to the AP, the request indicating which frequency sub-band each of the at least two STAs is to use for transmitting the response;
receive the responses to the request from the at least two STAs, wherein each of the responses comprises orthogonal frequency-division multiple access (OFDMA) symbols;
determine, for each of the at least two STAs, a time delay based on the responses; and
transmit control signalling to the at least two STAs, the control signalling comprising time alignment commands for the at least two STAs, wherein each time alignment command is based on the time delay for one of the at least two STAs.

36. A station (STA) for time synchronization of the STA in a wireless local area network, the STA comprising a processing unit that comprises one or more of a central processing unit (CPU), a multiprocessor, a microcontroller, a digital signal processor (DSP), an application specific integrated circuit (ASIC), and a field programmable gate arrays (FPGA), capable of executing software instructions stored in a computer program product, the processing unit being configured to cause the STA to:
receive a request from an access point (AP) for the STA to transmit a response to the AP, the request indicating which frequency sub-band the STA is to use for transmitting the response and transmitted by the AP in response to the AP receiving indications that downlink data is to be transmitted to the STA;
transmit the response to the AP in the indicated frequency sub-band, wherein the response comprises orthogonal frequency-division multiple access (OFDMA) symbols; and receive control signalling from the AP, the control signalling comprising a time alignment command for the STA, wherein the time alignment command is based on a time delay for the STA determined based on the response.

* * * * *